United States Patent

[11] 3,626,085

| [72] | Inventors | Richard H. Arndt<br>Lenox;<br>Henry N. Tachick, Pittsfield, both of Mass. |
|---|---|---|
| [21] | Appl. No. | 27,497 |
| [22] | Filed | Apr. 13, 1970 |
| [45] | Patented | Dec. 7, 1971 |
| [73] | Assignee | General Electric Company |

[54] CABLE TERMINATION HOUSING HAVING MEANS FOR PREVENTING CORONA AND UNIFORMLY GRADING VOLTAGE
10 Claims, 3 Drawing Figs.

[52] U.S. Cl. ................................................. 174/73 R,
339/60 R, 339/101, 339/103 R, 339/143 C
[51] Int. Cl. .................................................. H02g 15/02
[50] Field of Search ....................................... 174/18, 73
R, 73 SC, 75 D, 80, 127; 339/59 R, 60 R, 60 C, 61
R, 136 R, 143 R, 143 C, 101, 102 R, 103 R, 111

[56] References Cited
UNITED STATES PATENTS

| 2,323,399 | 7/1943 | Jacobi | 174/73 R UX |
| 3,243,756 | 3/1966 | Ruete et al. | 339/60 R |
| 3,466,593 | 9/1969 | Arndt et al. | 174/73 R UX |
| 3,485,935 | 12/1969 | Kreuger | 174/73 R X |
| 3,512,118 | 5/1970 | Leonard | 174/18 UX |
| 3,513,425 | 5/1970 | Arndt | 339/143 C X |

Primary Examiner—Laramie E. Askin
Attorneys—Francis X. Doyle, Vale P. Myles, Frank L. Neuhauser, Oscar B. Waddell and Joseph B. Forman ABSTRACT: A modular termination housing, of a type adapted to be slipped onto a power distribution cable to afford a voltage-grading connector for the cable, is characterized by having a unique anticorona configuration. The unique anticorona feature of the termination housing is afforded by providing the housing with a flexible sealing means that assures continuous, uniform contact between a conductive coating on the outer surface of the housing and a conductive coating of a cable on which the housing is mounted.

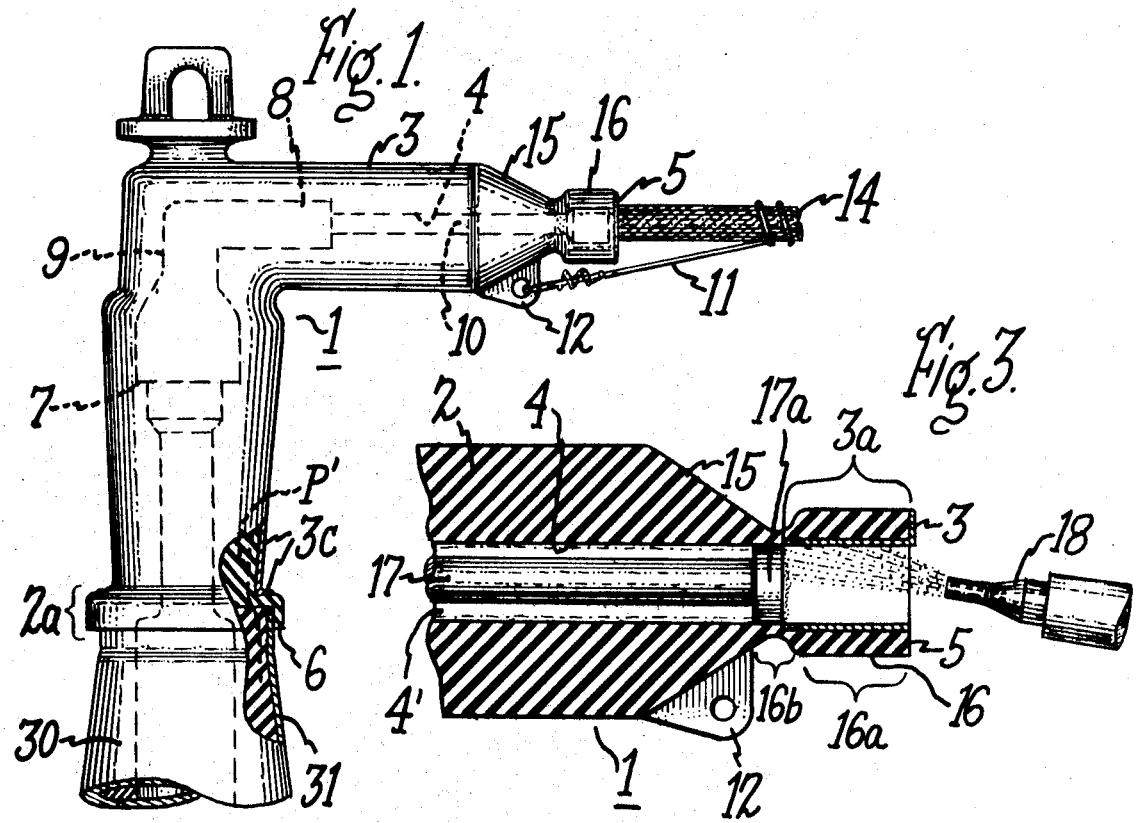
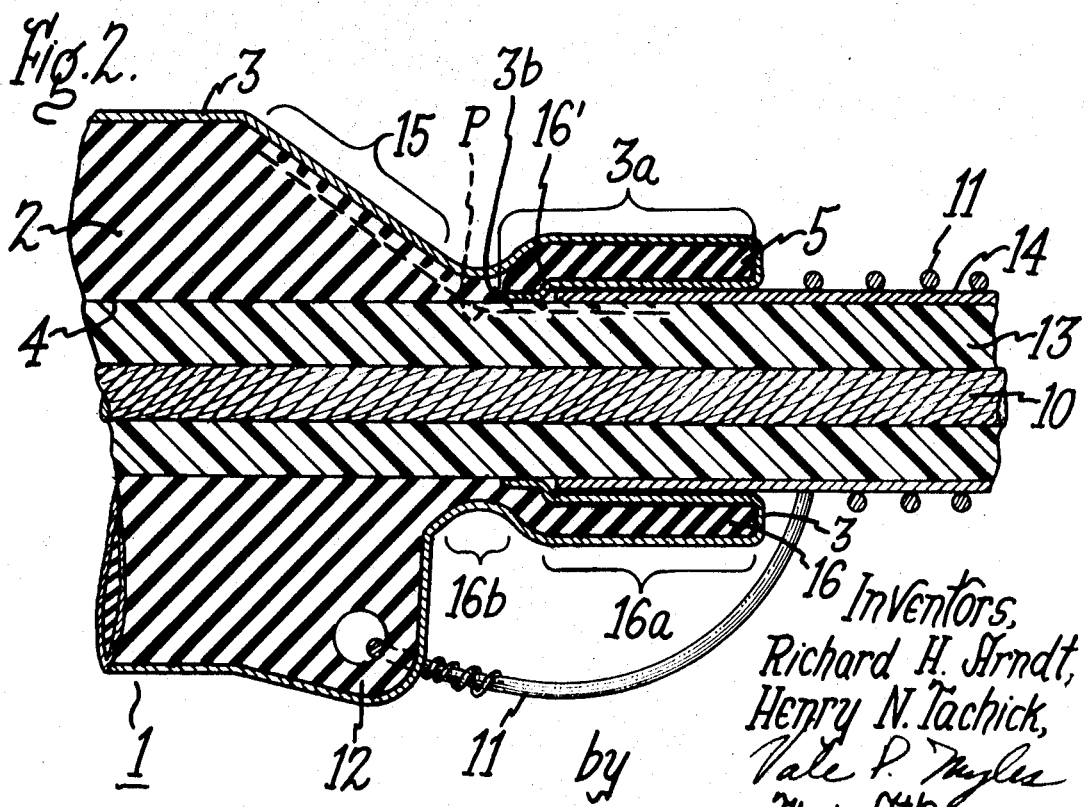

3,626,085

CABLE TERMINATION HOUSING HAVING MEANS FOR PREVENTING CORONA AND UNIFORMLY GRADING VOLTAGE

Two primary problems have long been recognized in the power cable distribution field relative to the requirements that must be met in terminating such cables. First, it is necessary to provide some form of voltage-grading stress cone at the termination, or interface end, of the cable to prevent corona from forming at such junctions. Second, it is necessary to seal such cable junctions against moisture and other contaminants of the type generally found in the environment of power cable distribution systems. Because these major parameters have long been identified, numerous devices have been developed to accomplish these two primary goals. However, the known prior art cable terminating devices can still be generally classified into two main categories. One of these categories involves the use of conductive tape to seal the junction between a cable termination housing and a cable on which the housing is mounted. In such arrangements, the conductive tape is simply wrapped in the form of a stress cone to provide the desired voltage-grading function. A primary advantage of this general type of arrangement is that it is very economical; however, experience has shown it to be one of the least reliable forms of cable termination. For example, the taped termination must be manually assembled in the field when the cable is terminated and it is usually undesirable to perform such operations in normal field conditions where dirt or moisture may inadvertently but unavoidably be trapped in the junction between the tape stress cone and either the cable or insulated termination housing. Moreover, such stress cone arrangements may be impaired if relative axial movement occurs between the cable termination housing and the cable, in response to temperature variations or other motivating forces.

The other common category of cable termination devices involves the use of a molded elastomeric stress cone that is either slipped on a cable over the junction between the cable and a cable termination housing mounted on it, or that is molded directly onto the termination housing. Such devices are generally much more reliable than simply using tape to seal and grade the junction between a termination housing and a cable, because the premolded stress cone arrangement eliminates most of the foregoing problems inherent in the use of conductive tape to form a stress cone grading and sealing arrangement for a cable termination. However, since the molded stress cone requires a separate molding operation, in addition to the molding operation required to form the insulating body of the termination housing on which it is mounted, this alternative is a relatively expensive one and is disadvantageous from that point of view.

A further disadvantage inherent in both of the general prior art types of cable termination designs is that they make no provision for distortion of the voltage-grading means due to disproportionate forces being applied to given areas of it by movement relative to the housing of the cable on which the termination housing is mounted. Accordingly, such cable movement frequently causes a gap to be formed between these prior art voltage-grading stress cone means and the conductive coating on a cable being terminated. Such gaps can cause corona, which is undesirable in itself due to the radio interference it may cause. In addition, such corona may eventually cause a line-to-ground fault on the system along the cable termination interface.

Another problem encountered in prior art cable termination housings is that they often concentrate steep voltage gradients across areas of the housing insulation, so that there is danger of insulation puncture and resultant system faulting. The present invention provides a solution to this problem as well as overcoming the other problems noted above.

Accordingly, a primary object of the present invention is to provide an economically manufacturable modular cable termination housing that overcomes the disadvantages of prior art cable termination devices.

Another object of the invention is to provide a cable termination housing having voltage-grading stress cone means thereon that resist the formation of corona-producing gaps between its voltage-grading stress cone and a conductive layer on a cable on which the termination housing is mounted.

A further object of the invention is to provide a cable termination housing having an inexpensively formed conductive coating thereon that affords a voltage-grading stress cone for the housing and also is arranged to maintain continuous contact with a cable on which the housing is mounted, even when the cable is moved angularly with respect to the longitudinal axis of the housing, thereby mechanically loading the stress cone of the housing.

Yet another object of the invention is to provide a flexible watertight sealing means for a cable termination housing that is operable to maintain a seal between the housing and a cable on which it is mounted when the cable is moved angularly with respect to the longitudinal axis of the housing.

Still another object of the invention is to provide a cable termination housing having a uniquely formed conductive coating on its outer surface and portions of its inner surface in order to afford means for smoothly distributing the voltage gradient formed between the coating and the energized cable on which the housing is mounted.

A still further object of the invention is to provide a unique method for forming a conductive coating on a cable termination housing so the coating will be thinner and more flexible than conductive coatings used heretofore on cable terminations.

In one preferred embodiment of the invention, a cable termination housing comprising a body of elastomeric insulating material is provided with a pair of embedded, electrically interconnected contacts mounted at recessed points, respectively, adjacent opposite ends of the housing. One end of the housing is conically shaped and the entire outer surface of the housing is coated with a thin layer of electrically conductive elastomeric material. This coating of elastomeric material is extended a predetermined distance into one of the recessed ends of the housing so that it doubles back on itself to aid in smoothing voltage gradients in the housing, and this end of the housing is adapted to fit in watertight sealing engagement over the semiconductive shield on a power cable with which the termination housing is adapted to be used. A unique flexible sealing means is provided to assure continuous electrical contact between the conductive coating of the recessed portion of the housing and the semiconductive shield on the cable, even when the cable is moved angularly with respect to the longitudinal axis of the housing causing it to mechanically load the housing.

Further objects and advantages of the invention will be apparent to those skilled in the art from the following description of it considered in conjunction with the accompanying drawings, in which:

FIG. 1 is a side elevation view of a cable termination housing, partly in cross section, constructed pursuant to the present invention and shown with respect to a power cable and distribution transformer bushing which are component parts of a conventional power distribution system of the type on which such cable termination housings find general application.

FIG. 2 is an enlarged side elevation view, in cross section, of a portion of the cable termination housing shown in FIG. 1, illustrated with respect to a portion of the power distribution cable also illustrated in FIG. 1.

FIG. 3 is a side elevation view, partly in cross section, of a cable termination housing similar to that shown in FIGS. 1 and 2 illustrating one step in a preferred method of manufacturing such a housing pursuant to the present invention.

Referring now to FIGS. 1 and 2 of the drawing, there is shown in generally L-shaped modular electric power cable termination housing 1 that forms an elbow. The body of the elongated housing 1 is made of elastomeric insulating material 2, shown in cross section in FIG. 2, and substantially the entire outer surface of the body of insulating material 2, except for the gas shield 2a, is covered with a coating 3 of elastomeric electrically conductive material. A further description of the unique characteristics of coating 3 is given below. The body of insulating material 2 may be formed in any desired configuration, such as the elbow shown, or other conventional forms of termination housings, and any suitable thermal molding process of the numerous types well known in the present art of manufacturing underground cable termination housings may be utilized to manufacture it. Pursuant to the present invention, the insulating body 2 is provided with wall means 4 defining a longitudinal passageway 4' extending through it from one end 5 to another end 6 of the body 2. Of course, the passageway 4' may be defined by any suitable wall means 4 but in the preferred embodiment of the invention disclosed herein the wall means 4 simply comprises a generally cylindrically shaped bore through the central portion of the insulating body 2, the walls of which are part of the insulating material of body 2.

When the housing 1 is assembled in operative position, as shown in FIG. 1, a pair of electrical contacts 7 and 8 are mounted in the passageway 4' of body 2 and these contacts 7 and 8 are electrically interconnected by any suitable means, such as by a conventional pair of threaded copper links (not shown). Such links would normally be embedded, in a manner depicted in phantom in FIG. 1, in a premolded sleeve of electrically conductive material 9 that serves to shield the junction between them and thus evenly distribute the electric field around this junction, in a manner now well known in the cable termination art. For example, U.S. Pat. No. 3,243,756, issued Mar. 29, 1969, discloses a suitable sleeve of this type used in a conventional manner. In addition, in the assembled arrangement depicted in FIG. 1, an insulated electric power cable 10 is shown connected to the contact 8 and a strand of a protective shield 11 of this cable is secured to a suitable apertured tab 12 on the outer surface of termination housing 1 in order to assure a good electrical contact between the shield wire 11 and the conductive coating 3 on housing 1. As is conventional in underground power distribution cables, the cable 10 is covered with one or more layers of insulating material 13 (shown in FIG. 2), and an outer semiconductive shield 14 that serves to uniformly distribute the electric field developed along the cable's length.

As mentioned above, when a modular cable termination housing, such as housing 1, is mounted in operating position on a high-voltage electric cable, such as cable 10, it is desirable to provide a means for uniformly grading the voltage field around the junction between the housing 1 and the cable 10. Toward this end, pursuant to the present invention, the housing 1 has a generally conical outer surface portion 15 near its end 5 and is designed to be slipped over cable 10, thereby to afford an electrical stress cone configuration for the conductive coating 3 mounted on this conical portion 15 of the housing 1, so that electric fields developed between the conductive coating 3 and the cable 10 will be uniformly graded from the relatively small outer diameter of semiconductive shield 14 on cable 10 to the larger outer diameter of housing 1. In addition to the conical outer surface portion 15, the housing 1 includes a generally cylindrical body portion 16 that is formed integrally in the molding process with the conical portion 15 of insulating body 2. As can best be seen in FIG. 2, the generally cylindrical portion 16 extends outward from the small diameter end of conical portion 15 so that the outermost end of the cylindrical portion 16 comprises the end 5 of termination housing 1.

An important feature of the present invention is the unique configuration of a portion of conductive coating 3 that is mounted on the generally cylindrical portion 16 of housing 1. Specifically, referring to FIG. 2 it can be seen that the conductive coating 3 includes a predetermined length of coating 3a that is substantially coextensive over its length with the interior surface of the generally cylindrical portion 16. It will also be noted that the length 3a of coating 3 on the inner surface of the generally cylindrical portion 16 extends beyond an annular stop 16' formed in portion 16 to engage and arrest a cable inserted into the housing 1. This unique arrangement causes a "virtual ground" plane to be formed from the innermost end 3b of coating 3 and the coating 3 on the small diameter end of conical portion 15. The resultant smooth, uniform voltage-grading plane is indicated in FIG. 2 by the dotted line P. When a cable, such as cable 10 is prepared for insertion into the termination housing 1, a portion of its outer semiconductive shield 14 is stripped from its insulating coating 13 in a manner such that the semiconductive shield 14 will terminate short of the innermost end of the predetermined length 3a of conductive coating 3, when cable 10 is operatively connected to contact 8 of the termination housing 1, in the manner shown in enlarged detail in FIG. 2 of the drawing. Specifically, the step 16' engages the end of shield 14 and arrests its inward movement in housing 1. Thus, in the operative relative positions of these component parts shown in FIG. 2, a substantial conductive interface is assured between virtually the entire predetermined length 3a of conductive coating 3 and the semiconductive shield 14 on cable 10. In view of the fact that the generally cylindrical portion 16 of termination 1 is formed of resilient elastic material and molded to a predetermined diameter that is slightly smaller on its inner dimension than the outer diameter of the semiconductive shield 14 on cable 10, the generally cylindrical portion 16 is forced to dilate slightly when the cable 10 is inserted into it. Therefore, because of the inherent resilience of portion 16, a firm electrical contact is assured through the predetermined length 3a of conductive coating 3 so that a low-resistance electrical path is formed between coating 3 and semiconductive shield 14 on cable 10. Due to the unique configuration of this conductive coating 3 and portion 3a, this conductive coupling is maintained even when relative longitudinal movement occurs between the semiconductive shield 14 and the termination housing 1, since a very appreciable overlap is assured between the predetermined length 3a of conductive coating 3 and the semiconductive shield 14 covered by it.

A second major feature of the present invention involves the provision of a substantially uniform wall thickness for a major part 16a of the length of generally cylindrical portion 16 while a minor part 16b of the length of generally cylindrical portion 16 has a thinner wall thickness. The thinner wall part 16b is arranged immediately adjacent the small diameter end of the conical portion 15 of housing 1 and forms an integral coupling between it and the thicker walled part 16a of the resiliently dilatable cylindrical portion 16 of the housing 1. In the preferred embodiment of the invention, the thinner walled part has a thickness between the innermost end of the coating 3b and the outer surface of the termination housing in the range of 10 to 30 mils. This configuration makes the minor part 16b much more flexible angularly with respect to the longitudinal axis of housing 1 than is the thicker part 16a. Accordingly, in the operation of the invention, when cable 10 is moved at an angle with respect to the longitudinal axis of housing 1, either under manual manipulating force, or due to the weight of the cable, the relatively thick portions of insulating body 2 and the thicker walled part 16a of generally cylindrical portion 16 tend to remain in firm watertight sealing contact with the insulating coating 13 and the semiconductive shield 14, respectively, because most of the angular movement is absorbed by the relatively more flexible minor part 16b of the termination housing. Thus, a seal formed by the inherent resilience of dilatable generally cylindrical portion 16 between it and the semiconductive shield 14 of cable 10 is not broken or sufficiently distorted to either allow moisture to seep into the termination housing 1, or to form a corona-developing gap between the shield 14 and any portion of the conductive coating 3—3a on housing 1. This advantage of the present invention is particularly important on underground cable termination housings, such as housing 1, which are to be used in connection with relatively heavy and thick power distribution cables that cause a very appreciable mechanical loading to be applied to the termination housing 1 due to the weight of the cable, since such applications necessarily result in some angular movement of the outermost end 5 of the termination housing 1 with respect to its generally longitudinal axis. Another important advantage afforded by the thin-walled part 16b is the improved voltage-grading function it provides in the manner described above. Due to the thin layer of insulation in part 16b between conductive end 3b of coating 3, and the part of coating 3 on the end of conical portion 15, the electric field developed by voltage on cable 10 is smoothly graded, as shown by the line P rather than forming sharp distortions in this field, as is common in prior art cable termination arrangements.

At this point in the description of the invention, it should be noted that the uniform voltage-grading principle of the invention is also applied at the other end 6 of termination housing 1, as well as adjacent the end 5. In this regard, by referring to FIG. 1, it can be seen that there is shown in cross section a portion of the end 6 of housing 1, and it will be noted that conductive coating 3 terminates at its end 3c, leaving the flared gas shield portion 2a of housing 1 uncoated. The transformer bushing 30, to which housing 1 is coupled is provided with a conductive ground coating 31 that extends to near its uppermost end on its outer surface, in a manner well known in the underground power distribution art. Accordingly, by making the shield portion 2a relatively thin walled pursuant to the present invention, it can be seen that voltage is graded smoothly through the "virtual ground" plane, indicated by dotted line P', due to the resultant close spacing between end 3c of coating 3 and the uppermost end of coating 31 on bushing 30. We have found that for present day power distribution voltages, the thickness of gas shield 2a should not exceed 35 mils, immediately adjacent the end 3c of coating 3, in order to assure the "virtual ground" plane characteristic of the invention at end 6 of termination housing 1.

It will be apparent from the foregoing description of the invention that various relative dimensions may be used for different applications; however, it has been found that optimum results are uniformly obtained when the thicker walled parts 16a of generally cylindrical portion 16 has a wall thickness at least 20 percent greater than the wall thickness of the thinner walled part 16b thereof. Moreover, it has been discovered that in underground cable distribution systems where relatively thick and inflexible power distribution cables are used in combination with the termination housings, such as housing 1, it is desirable to increase the dilatable resilience of generally cylindrical portion 16 of the housing 1 while at the same time assuring a given degree of relative flexibility for the thinner walled part 16b of the housing 1. Toward this end, when the invention is to be used in such systems, it is frequently desirable to form the thicker walled part 16a of the generally cylindrical portion 16 so that its wall thickness is at least twice as great as the wall thickness of the thinner walled part 16b. Also, where system cable voltages are from 600 volts to 3 kilovolts, the thickness of thin-walled part 16b, between end 3b of coating 3 and the outer surface of body 2 should be in a range of 15 to 35 mils to assure smooth grading of voltage through the "virtual ground" plane described above.

In like manner, in such systems where the weight of the cable connected to termination housing 1 is sufficient to cause a very substantial mechanical stress loading of the end 5 of termination housing 1, we have found that optimum results are usually obtained by making the length of the generally cylindrical portion 16 of housing 1, as measured parallel to its longitudinal axis, such that the thinner walled part 16b thereof is equal to at least one-tenth of the length of the thicker walled part 16a, so that an adequate radius of flexibility is provided through the thinner walled part 16b to insure relatively easy movement of the thicker walled part 16a relative to the conically shaped portion 15 of housing 1. Also, when the invention is used on cables such as cable 10 that have an outside diameter of one-half inch or greater, it has been found that the generally cylindrical wall portion 16 of the housing 1 should have a length such that its thicker walled part 16a is at least one-half inch long. This dimension not only insures a good electrical contact despite relative longitudinal movement of the housing 1 with respect to cable 10, so that corona is prevented from forming between the coating 3 on housing 1 and the semiconductive shield 14 on cable 10, but it also improves the reliability of the watertight seal formed by the inherent resilience of the dilatable generally cylindrical portion 16 of housing 1.

Now that the general principles of the invention and some preferred manufacturing dimensions have been described in detail, reference is made to FIG. 3 of the drawing in which there is shown a portion of a cable termination housing 1 that is similar to the housing 1 illustrated in FIGS. 1 and 2 of the drawing. A description of the invention that will follow with reference to FIG. 3 will employ like reference numerals to those used in FIGS. 1 and 2 to designate similar component parts of the termination housing 1. Thus, the housing 1 is provided with a conical end portion 15 having an integral generally cylindrical portion 16 including a thick-walled part 16a and a thin-walled part 16b formed therewith. In the stage of manufacture shown in FIG. 3, the housing 1 does not have a completely formed conductive coating 3 thereon, since this coating is just in the process of being formed in the manufacturing cycle that will be described below with reference to FIG. 3.

In order to enable generally cylindrical portion 16 of housing 1 to move angularly with a minimum amount of mechanical resistance from the conductive coating 3, we have found that this coating 3 should not be more than 25 mils thick and preferably is nearer the low end of an optimum range of 5 to 25 mils in thickness. A further advantage inherent in using such a uniquely thin conductive coating 3, rather than using the much thicker, molded conductive termination jackets common on prior art terminations, is that the coating 3 is less likely to mechanically separate from the insulating body of housing 1 when the generally cylindrical portion 16 is moved through an angle thereby causing a sharp bend and appreciable stretching of coating 3 in the thin-walled part 16b of the housing 1. Of course, by eliminating such separation, the risk of corona damage to the termination 1 is also reduced, thus enhancing the value of this type of thin conductive coating 3.

We have found that a thin conductive coating of elastomeric material can be successfully mounted on the outer surface of housing 1 and the predetermined length 3a of passageway 4' by using any one of three techniques, none of which requires the use of an expensive thermal molding process such as that needed to form the thick conductive coatings on prior art terminations. In particular, we have found that such a coating can be formed by either painting, spraying or dip forming a suitable conductive elastomer onto desired areas of the surface of termination housing 1. One of these methods will now be explained in more detail and it will be understood by those skilled in the art that the steps thus described may be employed in generally the same sequence to implement either of the other two methods of forming coating 3, if such alternative methods are desired.

Accordingly, pursuant to the present invention, a suitably configured termination housing 1 is formed by any conventional thermal molding process so that a housing 1 having a conical portion adjacent one of its ends 5 and wall means 4 defining a passageway 4' therethrough from end to end is thus formed. At this stage of the manufacturing process, rather than utilizing the prior art technique of molding a thick conductive layer on the outer surface of the housing 1 to provide the necessary voltage-grading functions for the housing, a mandrel 17 having an enlarged end 17a thereon that fits tightly in the passageway 4' defined by wall means 4 is inserted into the passageway to the position illustrated in FIG. 3. Therefore, all except the predetermined length 3a of the area of coating 3 to be formed is left open to the outer end 5 of the housing 1. When the mandrel 17 is in this position, a layer of electrically conductive elastomeric material is sprayed on the inner surface of generally cylindrical portion 16 and then over the entire outer surface of the termination housing 1 to form a coating 3 that is substantially coextensive with the outer surface of the termination 1, in the manner discussed above with reference to FIGS. 1 and 2 of the drawing. Preferably, this coating 3–3a is approximately 5 mils thick, but may be made to 25 mils thickness without impairing the flexibility of thin walled part 16b.

For illustrative purposes, a spray gun 18, which may be any suitable type, is depicted in FIG. 3, but it will be understood that either of the other two methods noted above may be utilized for forming the coating 3–3a on termination housing 1 at this step of the manufacturing process; rather than requiring a separate molding operation to form this coating as has been the practice in the prior art. For example, an adequately thick and flexible conductive coating 3 can be formed on a termination, such as termination housing 1, by dipping a premolded housing 1 into a molten bath of electrically conductive elastomeric material thereby to deposit a layer of at least 15 mils thickness, and not more than 25 mils thickness, over substantially the entire outer surface of the housing 1 and over the predetermined length 3a of the passageway 4' defined through the housing, which is not protected by the blocking mandrel 17. The coating 3 may be formed of any well-known conductive elastomeric material, for example, one of the compositions of sulfur-cured elastomeric compound that are now obtainable from the E. I. DuPont Manufacturing Company of Wilmington, Del., is suitable for forming such coatings. The specific composition of this electrically conductive coating is not a critical part of the present invention and no claim is made to such compounds in this application. However, an example of a coating composition that has been found to have satisfactory characteristics for this application is set forth in U.S. Pat. No 3,376,541 Link, entitled "Safe Break Terminator," which was issued Apr. 2, 1968 and is assigned to RTE Corporation of Waukesha, Wisconsin. After the coating 3—3a is formed on the housing 1, the housing is placed in an oven to cure the coating 3–3a thereby causing it to form a lasting bond with housing 1. This curing operation may be performed in an oven heated to 150° C. and ideally continues for a period of 4 hours plus or minus one-half hour, depending on the thickness of the coating being cured.

Further modifications and improvements of the invention will be apparent to those skilled in the art from the foregoing description of it and the claims appended hereto, therefore, it is intended in the appended claims to encompass all such modifications and improvements within the true spirit and scope thereof.

What we claim and desire to secure by Letter Patent of the United States is:

1. An electric power cable termination housing comprising an elongated body of elastomeric insulating material, wall means defining a passageway through said body from one end to another end thereof, and a coating of electrically conductive material mounted on and substantially coextensive with a major part of the outer surface of said body, a portion of said coating of conductive material also being mounted on a predetermined length of said wall means extending inward from said one end of the body, the wall means of said passageway adjacent said one end of the body being resiliently dilatable and adapted to receive therein in watertight sealing relationship an insulated electric cable having a semiconductive outer shield, said resiliently dilatable wall means being operable to hold the conductive coating on the wall means in electrical contact with the semiconductive outer shield on a cable positioned in the housing in watertight sealing relationship with said predetermined length of the wall means, said body of insulating material being formed to define a generally conical outer surface portion near said one end thereof to afford an electrical stress cone for grading electric fields developed when an energized high-voltage cable is mounted in said passageway, and including a generally cylindrical body portion formed integrally with said conical outer surface portion and extending outward therefrom, the outer end of the generally cylindrical portion of said body comprising said one end of the body, said generally cylindrical body portion being formed to have a substantially uniform wall thickness over a major part of its length and to have a thinner wall thickness for a minor part of its length at the end thereof adjacent said conical outer surface portion of the body of insulating material, said thinner walled minor part of the generally cylindrical body portion being substantially more flexible than the thicker walled major part thereof so that said thicker walled part can move at an angle with respect to the longitudinal axis of said passageway without being stretched sufficiently to break a seal between it and a cable positioned therein while said thinner walled part flexes to allow such movement.

2. An invention as defined in claim 1 wherein said thicker walled part of the generally cylindrical portion of said insulating body has a wall thickness at least 20 percent greater than the wall thickness of said thinner walled part thereof.

3. An invention as defined in claim 2 wherein aid thicker walled part has a wall thickness at least twice as great as the wall thickness of the thinner walled part.

4. An invention as defined in claim 2 wherein said thinner walled part has a length parallel to the longitudinal axis of said generally cylindrical portion that is equal to at least one-tenth of the length of said thicker walled part.

5. An invention as defined in claim 4 wherein the length of said thicker walled part of the generally cylindrical portion is at least one-half inch.

6. An invention as defined in claim 5 wherein said thinner walled part has a length at least equal to the thickness of its walls.

7. An invention as defined in claim 1 wherein said thinner walled part has a thickness between the innermost end of said coating and the outer surface of the termination housing in the range of 10 to 30 mils.

8. An invention defined in claim 1 including a flared gas shield formed integral with the other end of said housing, said coating on the housing being substantially coextensive with the entire outer surface of the housing except for said gas shield, whereby the conductive coating is spaced a substantial distance from said other end of the housing to define one end of a "virtual ground" plane through the insulating wall of said gas shield when the housing is coupled in operating position to a bushing having a conductive coating on its outer surface which forms the other end of said "virtual ground" plane.

9. An invention as defined in claim 8 wherein the thickness of the insulating wall of said gas shield immediately adjacent the end of said conductive coating is not greater than 35 mils.

10. An invention as defined in claim 1 wherein said coating of conductive material is at least 5 mils thick and no greater than 25 mils thick over substantially the entire outer surface of said termination housing.

* * * * *